United States Patent

Bernard et al.

[15] 3,644,232

[45] Feb. 22, 1972

[54] FLAME-RESISTANT, NONBURSTING POLYISOCYANURATE FOAMS

[72] Inventors: David L. Bernard, Pittsburgh; John K. Backus, Allison Park; William C. Darr, Bridgeville, all of Pa.

[73] Assignee: Mobay Chemical Company, Pittsburgh, Pa.

[22] Filed: May 24, 1968

[21] Appl. No.: 731,705

[52] U.S. Cl............260/2.5 AW, 260/2.5 AT, 260/77.5 NC, 260/453 A, 260/570.8 R, 260/DIG. 24
[51] Int. Cl. .....................................C08g 22/18, C08g 22/46
[58] Field of Search...............................260/2.5 AW, 2.5 AT

[56] References Cited

UNITED STATES PATENTS

| | | | |
|---|---|---|---|
| 3,496,229 | 2/1970 | Powers et al........................260/570 |
| 3,516,950 | 6/1970 | Haggis....................................260/2.5 |

FOREIGN PATENTS OR APPLICATIONS

| | | | |
|---|---|---|---|
| 1,478,759 | 3/1967 | France..................................260/2.5 |
| 1,511,865 | 2/1968 | France..............................260/2.5 UX |

OTHER PUBLICATIONS

Dutch Pat. Specification Publication No. 67– 05694 (15 pages) Published Oct. 23, 1967.

*Primary Examiner*—Donald E. Czaja
*Assistant Examiner*—H. S. Cockeram
*Attorney*—Clelle W. Upchurch and Gene Harsh

[57] ABSTRACT

Polyisocyanurate foams are prepared by reacting an organic polyisocyanurate mixture of polyphenyl polymethylene polyisocyanates wherein from about 10 to about 70 percent of the total methylene groups are ortho to at least one NCO group and from about 2 percent to about 20 percent of the total methylene groups are ortho to two NCO groups on adjacent aromatic rings. The polyisocyanurate foam is prepared from this mixture of isocyanates in the presence of a trimerization catalyst and an inert blowing agent and preferably a foam stabilizer. These foams when subjected to a flame do not pop and burst into fragments.

4 Claims, No Drawings

FLAME-RESISTANT, NONBURSTING POLYISOCYANURATE FOAMS

This invention relates to polyisocyanurate foams and more particularly to polyisocyanurate foams which have improved properties, particularly flame resistance and other physical properties.

It has been proposed heretofore to prepare polyisocyanurate foams by mixing an inert blowing agent with a mixture of polyphenyl polymethylene polyisocyanates and causing the —NCO groups to trimerize in the presence of a trimerization catalyst. The resulting foam is hard, has a fine celled structure and gives the outward appearance of being a satisfactory building material for either a structural member or for use as insulation. However, foams prepared from commercially available polyphenyl polymethylene polyisocyanates pop and burst into fragments when they are subjected to a flame. The resulting fragments burn readily with a lot of smoke and noxious fumes being generated. Therefore, these foams will not pass existing tests so that they can be accepted by insurance underwriters as suitable building materials, for example, in either commercial building or in dwellings or the like. The building code requirements with regard to flammability are measured by the tunnel test, ASTM Test E-84. The heretofore known polyisocyanurate foams based on polyphenyl polymethylene polyisocyanate have failed to achieve a satisfactory level because of their tendency to pop and burst out in a flame, thus generating many small and easily burned fragments.

It is, therefore, an object of this invention to provide polyisocyanurate foams which have improved flame resistance and other improved properties. Another object of this invention is to provide improved polyisocyanurate foams based on polyaryl polyalkylene polyisocyanates. A further object of this invention is to provide polyisocyanurate foams which do not pop and burst in a flame. Still a further object of this invention is to provide polyisocyanurate foams which will meet building codes for use along with other materials. Another object is to provide polyisocyanurate foams which exhibit reduced smoke generation in a fire. A further object is to provide an improved method of preparing polyisocyanurate foams. Another object is to provide an improved mixture of polyphenyl polymethylene polyisocyanates, particularly adapted for the preparation of polyisocyanurate foams.

The foregoing objects and others which will become apparent from the following description are accomplished in accordance with the invention, generally speaking, by providing a foamed polyisocyanurate polymer prepared by polymerizing, in the presence of a suitable catalyst and an inert blowing agent, a mixture of polyphenyl polymethylene polyisocyanates which contain from about 10 percent to about 70 percent of the total methylene groups ortho to one —NCO group and from about 2 percent to about 20 percent of the total methylene groups ortho to two —NCO groups on adjacent aromatic rings. Thus, this invention contemplates the preparation of polyisocyanurate foam wherein a mixture of polyaryl polyalkylene polyisocyanurates with the amount of ortho substitution set forth above are reacted together to form a polyisocyanurate foam in the presence of an inert blowing agent, a trimerization catalyst and a foam stabilizer. Whereas the heretofore known polyphenyl polymethylene polyisocyanates which contain a lower percentage of ortho substitution yield a polyisocyanurate foam which will pop and burst out into fragments in a fire. The foams based on the polyphenyl polymethylene polyisocyanates set forth above do not show this property and, in addition, have improved physical properties over the foams prepared from the old isocyanate mixture. In addition to their superior physical properties the foams have overall good flammability characteristics.

The term "flammability" is used broadly herein to refer to the burning characteristics of the polyisocyanurates from many viewpoints including self-extinguishing properties, fuel contribution, flame spread, smoke generation, smoke density and gases produced. The prime factor in the early development of flame resistant foamed plastics, particularly for building materials, has been whether they could be made self-extinguishing. Just making the product self-extinguishing is inadequate since flammability requirements for materials to be used in construction of buildings take into account the other properties which are considered in building codes, particularly flame-spread and smoke generation factors. It is often the case that when the plastic product has been made self-extinguishing, i.e., the plastic does not continue to burn after the source of flame has been removed, that it is still unsatisfactory for use as a building material from the standpoint of fuel contribution, flame-spread, smoke generation and gases produced in a fire where other materials continue to supply fuel for the fire. Additives are often used in the heretofore known foamed plastics in order to make the foams self-extinguishing. These same additives often cause the smoke development and gaseous fume factors to increase to dangerous levels so that they cannot be safely used as building materials.

The polyisocyanurate foams of the invention are prepared by mixing the compounds set forth above and allowing them to foam. It is preferred to mix the blowing agent and a foam stabilizer or emulsifier with the mixture of polyisocyanates and then add the catalyst with rapid mixing and allow the reaction mixture to foam. The isocyanates, catalysts, blowing agents and stabilizers are more particularly described as follows.

Any suitable mixture of polyphenyl polymethylene polyisocyanates which contains from about 10 percent to about 70 percent of the total methylene groups ortho to one —NCO group and from about 2 percent to about 20 percent of the total methylene groups ortho to two —NCO groups on adjacent aromatic rings may be used. A particularly preferred mixture of polyphenyl polymethylene polyisocyanates has the formula:

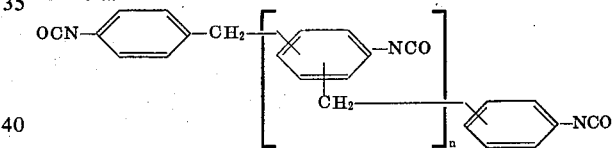

wherein $n$ has an average value of from about 0.1 to about 1.3 and is preferably from about 0.5 to about 0.8, the ortho content being as above.

A specific mixture of isocyanates contains about 30 percent 4,4'-diphenylmethane diisocyanate, about 20 percent 2,4'-diphenylmethane diisocyanate, about 3 percent 2,2'-diphenylmethane diisocyanate, about 10 percent

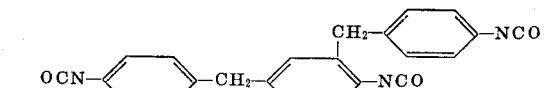

about 2%

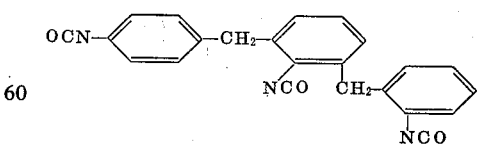

about 2%

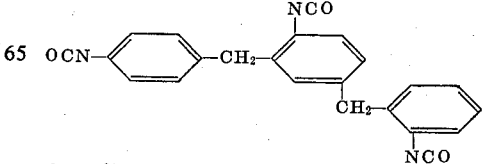

about 2%

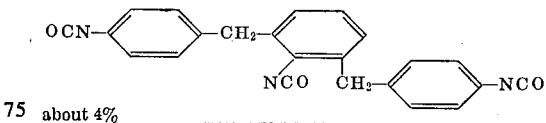

about 4%

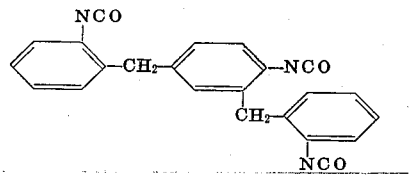

and about 27 percent tetra and higher functional homologues of the foregoing isocyanates, the percentage of methylene groups which have one or two —NCO groups ortho thereto is about 66 percent of the total number of methylene groups in said higher functional isocyanate. It is to be understood that any other suitable mixture may be used provided that it meets the foregoing conditions with regard to ortho substitution. The mixture of polyaryl polyalkylene polyisocyanates of the invention is prepared by first condensing aniline with formaldehyde or a precursor thereof in the presence of an acid having a pKa at 25° C. of from about 1.5 to about 5 at an amine to acid molar ratio of about 100 to 1 to about 200,000 to 1 and in the presence of a catalytic amount of sodium chloride of from about 0.01 percent to about 5 percent by weight based on the weight of the whole reaction mixture. The reaction mixture is heated to a temperature of about 150 to about 350° C. for a short time and after the resulting mixture of amines which corresponds substantially to the foregoing mixture of isocyanates except that the —NCO groups are represented by $NH_2$ groups the reaction mixture is phosgenated in order to prepare the mixture of isocyanates. Specifically the isocyanate of the invention may be prepared as follows:

About 1 mol of 37 percent aqueous formaldehyde containing about 0.02 percent by weight of formic acid and about 4 mols of aniline are mixed. About 1 percent by weight of NaCl based on the weight of the aniline is added to the formaldehyde before mixing. The reactants are initially at a temperature of about 25° C. The formaldehyde is added in a single portion. The resulting aniline to formic acid molar ratio is about 16,600:1. After about 4 minutes the temperature in the reaction vessel has reached only about 55 to about 65° C. even without cooling. The product is held in the initial reaction vessel for about 15 minutes total and then pumped under pressure through a 12 foot section of steam jacketed 6 inch diameter schedule 40, 316 stainless steel pipe where the temperature is maintained at about 190° C. and the reaction mixture is under a pressure of about 200 p.s.i.g. The stainless steel pipe is packed with Raschig rings so that little or no back mixing occurs and the reaction mixture is removed via a let-down valve after a residence time of about 6 to 8 hours. Water and excess aniline are distilled off and the product filtered to remove the NaCl. A light amber product containing about 62 percent diamine and the balance polyamines is obtained.

The foregoing product contains about 30 percent of 4,4'-diphenylmethane diamine, about 20 percent of 2,4'-diphenylmethane diamine, about 3 percent of 2,2'-diphenylmethane diamine, about 10 percent of

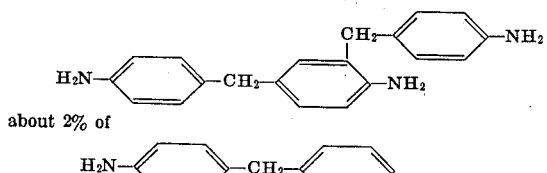

about 2% of

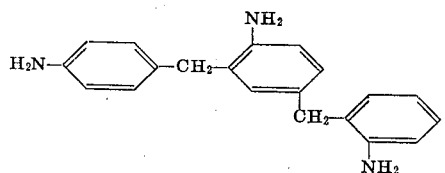

about 2% of about 2½ of

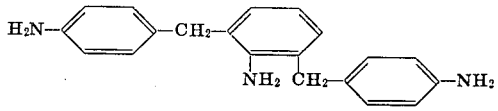

about 4% of

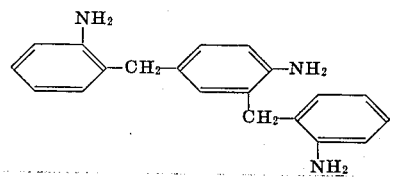

and about 27 percent of a tetra and higher functional homologues of the foregoing amines, and having about 66 percent of the methylene groups in the higher functional isocyanates which have one or two —NCO groups ortho thereto.

The resulting mixture of amines is then reacted with phosgene first at a temperature of about 0° C. and subsequently with additional phosgene at a temperature above about 90° C. until the resulting mixture of amines is converted to isocyanate. This mixture of isocyanates corresponded to the foregoing mixture except that the $NH_2$ groups have been converted to —NCO groups.

Any suitable emulsifier or stabilizing agent may be used in the preparation of the isocyanurate foams of this invention including, for example, sulfonated castor oil or the like, but it is preferred to use a foam stabilizer which is based on silicone such as, for example, a polydimethyl siloxane or a polyoxyalkylene block copolymer of a silane. The latter type of silicone oil is disclosed in U.S. Pat. No. 2,834,748. Specific examples include

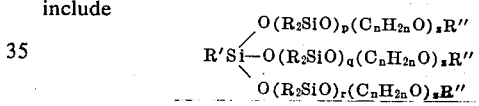

wherein R, R' and R'' are alkyl radicals having one to four carbon atoms; $p$, $q$ and $r$ each have a value of from 4 to 8 and $(C_nH_{2n}O)z$ is a mixed polyoxyethylene oxypropylene group containing from 15 to 19 oxyethylene units and from 11 to 15 oxypropylene units with z equal to from about 26 to about 34. Most preferred is a compound having the formula

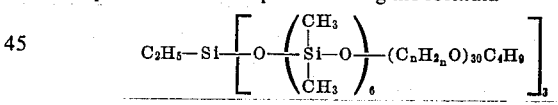

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Pat. Nos. 668,537; 668,478 and 670,091. Other suitable compounds may therefore have the formula $(R')(SiO_3)_x(R_2SiO)_y[(C_nH_{2n}O)_aH]_a[R''']_{3x-a}$ where $x$ is an integer and represents the number of trifunctional silicone atoms bonded to a single monovalent or polyvalent hydrocarbon radical, R'; R is a monovalent hydrocarbon group as defined above; a is an integer having a value of at least 1 and represents the number of polyoxyalkylene chains in the block copolymer; y is an integer having a value of at least 3 and denotes the number of difunctional siloxane units, n is an integer from 2 to 4 denoting the number of carbon atoms in the oxyalkylene group; and z is an integer having a value of at least 5 and denotes the length of the oxyalkylene chain. It will be understood further that such compositions of matter are mixtures of such block copolymers wherein y and z are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si$- where R is monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

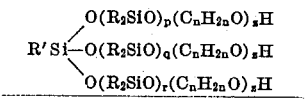

where $p+q+r$ has a minimum value of 3, the other subscripts being the same as in the immediately foregoing formula. In this instance, all three of the oxyalkylene chains are joined to the end of polysiloxane chains of the type $-(R_2SiO)-$. Specifically, one could use

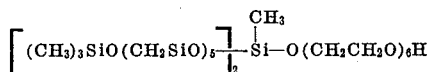

As pointed out above it is essential that the blowing agent be of the inert type, such as, for example, low boiling hydrocarbon such as pentane, hexane, heptane, pentene, heptene, benzene and the like, azo compounds such as azohexahydro benzodinitril and the like, halogenated hydrocarbons such as dichlorodifluoromethane, dichlorodifluoroethane, trichlorofluoromethane, isopropyl chloride, methylene chloride and the like and acetone.

It is important to the invention to sue a catalyst for the preparation of the isocyanurate foam from the organic polyisocyanate and any suitable trimerization catalyst may be used which will give the proper rate of polymer growth so that cellulation will occur under the reaction conditions. Generally speaking, it has been found that the rate of catalysis is somewhat related to the temperature of the reaction and that some catalysts promote the reaction at room temperature while others promote is preferentially at higher temperatures.

The preferred catalysts are those which will cause gelation of the isocyanate to form an isocyanurate at a temperature of 20° C. in 10 minutes when mixed in an amount of 1 to 10 grams of the catalyst per 100 grams of the organic polyisocyanate. Catalysts which meet these conditions include sodium phenate, sodium trichlorophenate, 2,4,6-tri-(dimethylaminomethyl)-phenol, a mixture of 80 percent ortho and 20 percent para dimethylaminomethyl phenol and the like. It is also possible to use other catalysts which will cause the formation of isocyanurates at temperatures above 20° C. but if these catalysts are used it is necessary to suffer the disadvantage of using a higher temperature and pressure or a blowing agent which will not expand until the higher temperature is reached. The catalysts which may be used at the higher temperatures include those set forth above as well as lead naphthenate, potassium oleate, lead benzoate, lead octoate and the like.

Thus, the essential compounds for the preparation of the polyisocyanurate foam are the particular mixture of polyphenyl polymethylene polyisocyanates, the inert blowing agent and the catalyst. It is preferred to also use a foam stabilizer as set forth above. In addition various modifications of the invention are possible. Thus, one may use a small amount of an active hydrogen containing component which has a molecular weight of from about 350 to about 10,000 and which has from 1 to 6 active hydrogen containing groups which are reacted with an —NCO group in the reaction mixture in order to prepare a polyisocyanurate urethane foam. These active hydrogen containing compounds may be used in an amount of from about 0 to 15 parts by weight per 100 parts of polyphenyl polymethylene polyisocyanate.

Any suitable active hydrogen containing compound having a molecular weight of 350 to 10,000 and having one to six active hydrogen containing groups which will react with an — NCO group may be used. The preferred molecular weight range is 500 to 3,000. It is preferred to use compounds that have free hydroxyl groups but compounds with carboxylic acid groups, free primary or secondary amino groups, thiol groups or the like may also be used.

Any suitable compound having one to six free hydroxyl groups and a molecular weight of 300 to 10,000 may be used such as, for example, ethers, esters, thioesters, acetals, hydrocarbons and the like.

The hydroxyl compounds include the alkylene oxide modified wood rosins obtained by the destructive distillation of pine wood and particularly pine stumps. The resins taken from the wood include materials both soluble and insoluble in aliphatic hydrocarbons and which are obtained from wood by destructive distillation. They may be further cooked or blown with air in order to produce various polymerizates. The exact nature of these materials is not known but they are sold under various tradenames including Vinsol, Belro, Plasticized Vinsol, Solo and Crosby–900.

"Vinsol" is a resin taken from pine wood, hard, brittle, darkened and thermoplastic. It has a specific weight of 1.218(20° C.), a softening point of 112°-115° C., an ignition point of 235° C. and an acid number of 93. It is very insoluble in the petroleum solvents, soluble in alcohols, ketones and esters and partially soluble in the aromatic hydrocarbons. This resin, at a high melting point, is obtained from the first extraction fraction with a solvent in the course of the destructive distillation of pine wood from the south of the United States. This resin is a complex mixture of numerous constituents, including acid phenol products in the form of phenols of a high molecular weight and of carboxylated phenols. It contains also acid products from resin acids and oxidized resin acids. Moreover, neutral compounds of high molecular weight are present, which probably come from resinous and polymerized terpenes. It also contains a little wax. In addition to carboxyl and phenolic hydroxyl groups, the "Vinsol" product has double bonds and active hydrogen which may lend itself to many reactions.

The "Belro" resin is a similar product of a noncrystalline nature. It has a specific weight of 1.138, a softening point of 86° C., an ignition point of 210° C. and an acid number of 119. It contains 60 percent of products insoluble in oil, it is partly soluble in the aliphatic hydrocarbons and in carbon tetrachloride and soluble in ethyl acetate, alcohol, acetone and the aromatic hydrocarbons. It forms a thermoplastic acid resin of a darkened color. It contains the acids usually present in resins, oxidation and polymerization products of those acids and terpenes and a small quantity of the usual colored and neutral constituents of resins. The acid number is in the neighborhood of 120. This product is drawn from the last extraction fraction by solvents during the destructive distillation of wood.

"Crosby–900" resin is a thermoplastic acid resin of a darkened color from the refining of wood resin by carefully regulated heat treatment, in which a reduction in the acid number, an increase of melting point and a reduction of the insoluble in the naphtha is obtained. The typical analysis corresponds to an acid number of 70, to a melting point of 103° C., to 40 percent insoluble in naphtha, saponification index being about 110 and the nonsaponifiable product rising to around 30 percent. Chemically, this resin resembles the "Vinsol" and "Belro" products.

"Solo" resin is also a thermoplastic acid resin of darkened color, which is obtained by the refining of wood resin.

Its softening point is about 118° C., and its acid number about 90. Chemically, it resembles other resins. The typical analysis indicated an acid number of 97, a melting point of 118° C., an insoluble in a petroleum solvent of 94 percent, a saponification index of 148 and about 13 percent of nonsaponifiable product.

These wood resins can be modified by reacting them with an alkylene oxide such as ethylene oxide, propylene oxide, ethylene chlorohydrin, styrene oxide or the like in order to prepare a product which has a molecular weight within the range specified, for example, ethylene oxide modified Vinsol having a molecular weight of about 500 and the like. It is also possible to use the monoesters of various glycols with high molecular weight acids such as, for example, the reaction product of melissic acid, cerotic acid, lignoceric acid, stearic with for example ethylene glycol, propylene glycol, butylene glycol, amylene glycol, hexamethylene glycol or the like, in order to prepare a monoester of the glycol which has sufficient molecular weight to fall within the range of 300 to 10,000 and preferably 500 to 3,000. Specifically the reaction product of 1 mol of the glycols set forth above with one mol of any of the acids set forth above will produce a product which falls within the range specified. One may also use the reaction product of an alkylene oxide with a monoamine having one reactive hydrogen atom such as, for example, the reaction product of diethyl amine with an alkylene oxide to prepare a monohydroxy compound such as, for example, the reaction product of diethyl amine with ethylene oxide or propylene oxide to prepare a product having a molecular weight of about 500. It is also possible to use the alkylene oxide modified alcohols or acids such as, for example, the reaction product of ethylene oxide, propylene oxide, ethylene chlorohydrin, styrene oxide or the like with any of monohydric alcohols or monocarboxylic acids set forth above provided the reaction is carried out to sufficient extent to obtain a molecular weight within the range specified including methyl alcohol, ethyl alcohol, n-propyl alcohol, isopropyl alcohol, n-butyl alcohol, n-hexyl alcohol, n-heptyl alcohol, n-octyl alcohol, lauryl alcohol, stearyl alcohol, oleyl alcohol and the like. Specific examples include the reaction product of ethylene oxide or propylene oxide with lauryl alcohol and the like to a molecular weight of 500 or to a molecular weight of 3,000. It is preferred in accordance with the invention to use products which have a functionality greater than 1, i.e., from 2 to 6. Included in this category are, for example, the polyalkylene ether polyols which can be prepared by initiating the polymerization of an alkylene oxide with an initiator such as water, ethylene glycol, propylene glycol, trimethylolpropane, glycerine, pentaerythritol, alpha methyl-d-glucoside, adonitol, xylitol, mannitol, sorbitol, dulcitol, methylene dianiline and particularly 4,4'-diphenylmethane diamine, toluene diamines including 2,4-toluene diamine, 2,6-toluene diamine and the like, ammonia, triethanolamine, phosphoric acid and particularly that which corresponds to a mixture of about 75 to about 90 percent phosphorus pentoxide and the balance water, all of which may be modified with various alkylene oxides including ethylene oxide, propylene oxide, butylene oxide, amylene oxide, styrene oxide, ethylene chlorohydrin and the like to prepare polyethers which have a molecular weight in the range specified and particularly products such as polyethylene glycol molecular weight 400 and 4,000, polypropylene glycol molecular weight 400, 750, 1,200 and 2,000 and the like. A further example is castor oil.

Still another type of compound containing one free hydroxyl group and having very high molecular weight which may be used are the so-called drying and semidrying vegetable oils such as, for example, linseed oil, safflower oil, corn oil, sunflower oil, perilla oil, chinawood oil, oiticica oil, poppy seed oil, sesame oil, soybean oil and the like, which have been modified with, for example, an alkylene oxide or by the introduction of an ethylenically unsaturated alcohol such as allyl alcohol, chloroallyl alcohol, meta allyl alcohol, beta-ethyl allyl alcohol, beta-propyl allyl alcohol, beta-phenyl allyl alcohol and the like, in order to introduce alcoholic hydroxyl groups.

The polyesters may also be used including, for example, polyesters of various di- or polyhydric alcohols with various di- or polycarboxylic acids, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimellitic acid, trimellitic acid, trimesic acid, mellophanic acid, prehnitic acid, pyromellitic acid, 1,4-cyclohexanedicarboxylic acid, 3,4,9,10-perylenetetracarboxylic acid, benzene pentacarboxylic acid, as well as acid anhydrides such as phthalic anhydride and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, xylitol, mannitol and the like. It is to be understood that no combination of acid and alcohol should be used which will produce a functionality greater than 6 or an extent of esterification outside the range of molecular weight which is specified for these products.

The polyesters may also be a lactone polyester prepared by the polymerization reaction of an admixture containing a lactone and an organic initiator, in the presence or in the absence of an ester interchange catalyst, to form lactone polyesters of widely varying and readily controllable molecular weights. The polymerization is initiated by reaction with one or more compounds having two reactive hydrogens capable, with or without the aid of a catalyst, of opening the lactone ring and adding it as an open chain without forming water of condensation. Compounds that are suitable for initiating the polymerization include those organic compounds which contain two hydroxyl (—OH) groups, or two primary amino (—NH$_2$) groups, or two secondary amino (—NHR) groups, or mixtures of such groups.

The lactone used as a starting material may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

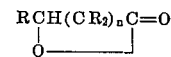

in which n is at least four, for example, from four to six, at least $n+2$ R's are hydrogen, and the remaining R's are hydrogen, alkyl, cycloalkyl, alkoxy or single ring aromatic hydrocarbon radicals. Lactones having greater numbers of substituents other than hydrogen on the ring, and lactones having five or less carbon atoms in the ring are considered unsuitable for the purposes of the invention because of the tendency that polymers thereof have to revert to the monomer, particularly at elevated temperatures.

Among the substituted epsilon-caprolactones considered most suitable for the purposes of the invention are the various monoalkyl epsilon-caprolactones such as the monomethyl-, monoethyl-, monopropyl-, mono-isopropyl-, etc., to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be employed.

Another class of materials which may be used includes the phosphorus containing polyols which have free —OH groups and may contain tertiary nitrogen atoms. Suitable examples of phosphorus containing compounds include di(hydroxyalkyl) alkyl phosphonites, R—P—[O—(R'—O)$_n$H]$_2$, alkyldi(hydroxyalkyl) phosphinites, RO—P[(R'—O)$_n$H]$_2$, hydroxyalkyl phosphites, P—[O—(R'—O)$_n$H]$_3$, hydroxyalkyl phosphates, PO—[O—(R'—O)$_n$H]$_3$, and the like where R is lower alkyl or phenyl (examples of lower alkyl are methyl, ethyl, propyl, butyl and the like) and R' is alkylene, preferably having from one to four carbon atoms, such as methylene, ethylene, 1,2-propylene, 1,2-butylene and the like and n is an integer preferably below 10. Many examples are disclosed in U.S. Pats. Nos. 3,009,939; 3,047,608; 3,053,878; 3,081,331; 3,088,917; 3,131,206 and 3,092,651.

In addition, one may use reaction products of phosphoric acid with a polyhydric alcohol or phosphorus-containing polyols which are prepared by reacting a half ester of an unsaturated carboxylic acid and a polyhydric alcohol with a trialkyl phosphite. Phosphorus containing polyols which also contain nitrogen may be used including those having the formula:

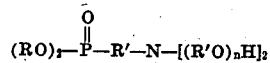

where R and R' have the meanings given above and n is a positive integer sufficient to give a molecular weight of 350 to 10,000 such as

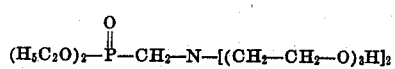

One may also use in addition to the hydroxyl compound, acids, amines and the like, or compounds which contain both acid groups and hydroxyl groups or amino groups and hydroxyl groups or the like. Furthermore, one may adjust the proportions of the components going into the polyester so that a product which contains free carboxylic acid groups having a molecular weight in the range specified is produced instead of one having free hydroxyl groups. In fact, polyesters with free carboxylic acid groups may be desirable for the invention since amide groups have a tendency to give better properties from a flammability viewpoint than do the urethane groups.

The acids which may be used along or in conjunction with other compounds include melissic acid, cerotic acid, lignoceric acid, dimerized linoleic acid, the reaction product of two mols of a dicarboxylic acid with one mol of ethylene glycol such as, for example, the reaction product of two mols of phthalic acid with one mol of ethylene glycol or one mol of propylene glycol, terephthalic acid may be substituted for the phthalic acid. Furthermore, one may use the reaction product of two mols of a dicarboxylic acid such as phthalic acid or terephthalic acid with one mol of ethylene diamine or other alkylene diamine such as propylene diamine, phenylene diamine or the like. In addition one may use phosphorus containing carboxylic acids such as, for example, the phosphite having the formula:

One may also use trimerized linoleic acid as well as mixtures thereof with the dimerized linoleic acid. Furthermore, the reaction product of three mols of a dicarboxylic acid such as phthalic acid or terephthalic acid with one mol of triethanolamine or with one mol of triethanolpropane may be used as the carboxyl terminated compound. In addition, linoleic acid may be polymerized to form a product having four free carboxylic acid groups which is suitable for use in accordance with the present invention. When the monofunctional compounds are used it is preferred to prereact them with the polyaryl polyalkylene polyisocyanate and then prepare the polyisocyanurate foam.

It is also possible to add a small amount of a catalyst which will cause the formation of carbodiimide groups along with the catalyst which will cause the formation of isocyanurate groups in the preparation of the improved foams of this invention. It is preferred not to have more than about 45 percent of the total carbodiimide and isocyanurate groups present as carbodiimide groups. It is possible to add a catalyst which will promote the formation of carbodiimide to the mixture of the invention in a first step to prepare a carbodiimide and then to carry out the formation of the polyisocyanurate foam in a second step.

Any suitable catalyst for the formation of carbodiimide groups may be used, however, it is preferred to use those catalysts which will cause the formation of carbodiimide groups at 30° C. or less. Suitable catalysts of this type include phospholines, phospholine oxides and sulfides, phospholidines and phospholidine oxides and sulfides. The phospholine oxides and sulfides are described in U.S. Pats. Nos. 2,663,737 and 2,663,738. The phospholidine oxides are described in U.S. Pat. No. 2,663,739. The corresponding phospholines and phospholidines may be prepared by a lithium aluminum hydride reduction of the corresponding dichloro phospholine or phospholidine. These dichloro compounds are also used to prepare the above mentioned oxides and sulfides and are described in U.S. Pat. No. 2,663,736. Representative phospholines include 1-phenyl-3-phospholine, 3-methyl-1-phenyl-3-phospholine, 1-ethyl-3-phospholine, 3-isopropyl-1-phenyl-3-phospholine and 3-(4-methyl-3-pentenyl)-1-phenyl-3-phospholine. Of the phospholine oxides and sulfides which may be used, the following may be mentioned: 3-methyl-1-phenyl-3-phospholine 1-oxide, 1-ethyl-3-methyl-3-phospholine 1-oxide, 1-ethylpheny-3-methyl-3-phospholine 1-oxide, 3-(4-methyl-3-pentenyl)-1-phenyl-3-phospholine 1-oxide, 3-chloro-1-phenyl-3-phospholine 1-oxide, 1,3-diphenyl-3-phospholine 1-oxide, 1-ethyl-3-methyl-3-phospholine 1-sulfide, 1-phenyl-3-phospholine 1-sulfide and 2-phenylisophosphindoline 2-oxide. Representative phospholidines include 1-phenylphospholodine, 3-methyl-1-phenylphospholidine, 1-ethyl-3-methylphospholidine and 1-ethylphospholidine. Suitable phospholidine oxides include 1-ethyl-3-methylphospholidine 1-oxide and 1-phenylphospholidine 1-oxide. Thus, the catalysts preferably have the formula

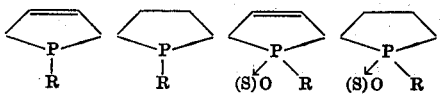

In the foregoing formula R may be any suitable alkyl, aryl, alkaryl or heterocyclic radical as is amply demonstrated by the examples set forth above.

It will be apparent from the comparison set forth in the working examples set below that the polyisocyanurate foams of this invention are vastly superior to the heretofore known polyisocyanurate foams based on polyphenyl polymethylene polyisocyanate even when measured by the stringent standards of ASTM E–84. Thus, the flame spread rate is much lower, there is little fuel contribution and the smoke density factor is down to a satisfactory level. The true meaning of these facts is that a product is available which can be used safely as a building material and which will pass the requirements of insurance underwriters for use in both residential and commercial buildings. The utility of these foams is vastly improved since they can be used in buildings where the heretofore known foams were unsuitable as building materials, particularly as insulation or structural members in the walls of dwellings or the like.

The invention is further illustrated but is not intended to be limited by the following examples in which all parts and percentages are by weight unless otherwise specified.

EXAMPLE 1

About 20 parts of trichlorofluoromethane, about 2 parts of silicone oil having the formula

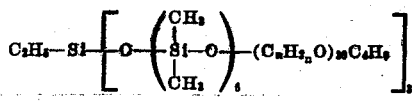

wherein $(C_nH_{2n}O)$ is a mixed polyoxyethylene and oxypropylene block copolymer containing about 17 oxyethylene units and about 13 oxypropylene units, about 10 parts of 2,4,6-tris-(dimethylaminomethyl)phenol are mixed with about 100 parts of a mixture of polyphenyl polymethylene polyisocyanates which contain from about 30 percent 4,4'-diphenylmethane diisocyanate, 20 percent 2,4'-diphenylmethane diisocyanate, 3 percent 2,2'-diphenylmethane diisocyanate, 10 percent of

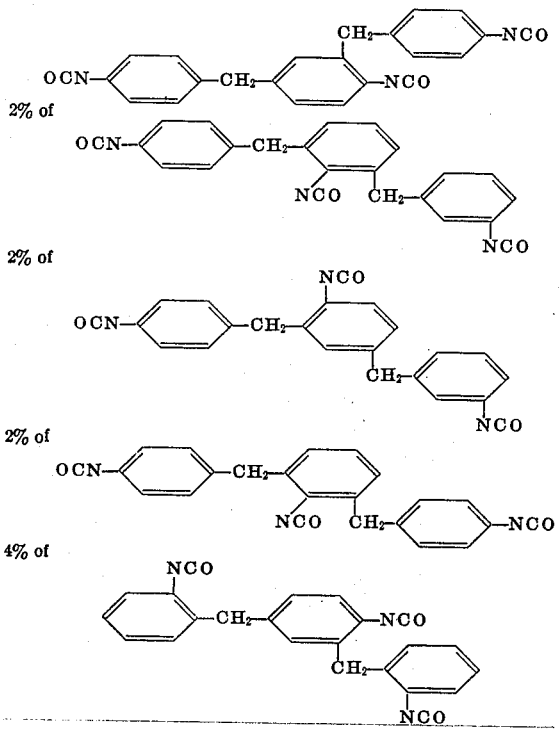

and 27 percent tetra and higher functional homologues of the foregoing isocyanates, the percentage of methylene groups which have one or two —NCO groups ortho thereto is about 66 percent of the total number of methylene groups in said higher functional isocyanate.

A slab of foam about 2 inches by 20 inches by 25 feet is prepared and subjected to the tunnel test by ASTM E-84 This foam had a flame spread rating of 25, a fuel contribution rating of 15 and a smoke density rating of 25. In addition, its density was about 1.6 lbs./cu.ft. and showed a compressive strength of 21 lbs./in.² and dimensional stability after 2 weeks at 70° C. 100 percent relative humidity showed only a 6.2 volume change.

After 2 weeks at 100° C. at ambient relative humidity there was no volume change.

Additional foams in Examples 2 and 3 were prepared by following essentially the same procedure as in Example 1 with the amounts and results indicated in the following table. In the following table the polyol is a propylene oxide adduct or trimethylol propane having a molecular weight of 440.

The foams in Examples 4 through 6 were duplicates of those prepared in Examples 1 through 3 but were cured for 24 hours at 125° C. rather than at room temperature.

Foams in Examples 7 through 12 duplicated the formulations and conditions of Examples 1 through 6 but were based on a mixture of polyphenyl polymethylene polyisocyanates in which less than 10 percent of the —NCO groups are ortho to one or two methylene groups. The foams of Examples 6 through 9 were cured at room temperature and those of Examples 10 through 12 for 24 hours at 125° C.

It is to be understood that the foregoing examples are given for the purpose of illustration and that any other suitable mixture of polyphenyl polymethylene polyisocyanates, inert blowing agent, trimerized catalyst, foam stabilizer or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A flame resistant polyisocyanurate foam which does not burst into fragments when subjected to a flame prepared by a process which comprises polymerizing, in the absence of an active hydrogen component, but in the presence of a catalyst which will catalyze the formation of isocyanurate groups and an inert blowing agent, a mixture of polyphenyl polymethylene polyisocyanates which contains from about 10 to about 70 percent of the total methylene groups ortho to one —NCO group and from about 2 to about 20 percent of the total methylene groups ortho to two —NCO groups on adjacent aromatic rings.

2. The polyisocyanurate foam of claim 1 wherein said mixture of isocyanates contains about 30 percent 4,4'-diphenylmethane diisocyanate, 20 percent 2,4'-diphenylmethane diisocyanate, 3 percent 2,2'-diphenylmethane diisocyanate, 10 percent of

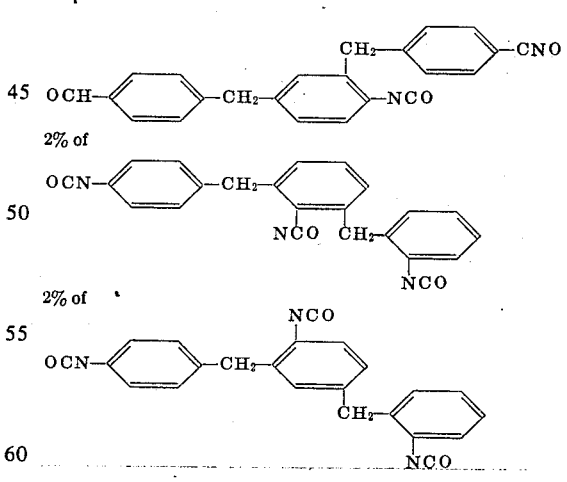

| Example | Parts by weight/100 polyisocyanate | | | | Density (lbs./ft.³) | Comp. str. (p.s.i.) | Dimensional stability, 100° C.; AMB RH Δ vol. percent | ASTM E-84 tunnel | | | Comments |
| | Polyol | CFCl₃ | Silicone oil | 2,4,6-tris-(dimethyl-aminomethyl) phenol | | | | Flame spread rate | Fuel contribution factor | Smoke density factor | |
| --- | --- | --- | --- | --- | --- | --- | --- | --- | --- | --- | --- |
| 2 | 7.5 | 22 | 2 | 10 | 1.7 | 23 | 0 | 35 | 20 | 50 | |
| 3 | 15 | 23 | 2 | 10 | 1.6 | 19 | 1 | 35 | 10 | 100 | |
| 4 | 0 | 18 | 2 | 11 | 1.5 | 18 | 0.3 | 30 | 10 | 45 | |
| 5 | 7.5 | 22 | 2 | 10 | 1.6 | 23 | 0.5 | 30 | 15 | 55 | |
| 6 | 15 | 23 | 2 | 10 | 1.6 | 18 | 2.4 | 35 | 10 | 100 | |
| 7 | 0 | 18 | 2 | 9 | 1.9 | 36 | 1.4 | 130 | | >85 | Violent fragmentation. |
| 8 | 7.5 | 23 | 2 | 7.5 | 1.7 | 21 | 0.4 | 85 | | >160 | Do. |
| 9 | 15 | 23 | 2 | 6 | 1.8 | 23 | 1.1 | 40 | | 140 | |
| 10 | 0 | 18 | 2 | 9 | 1.9 | 35 | 0.7 | 85 | | >275 | Do. |
| 11 | 7.5 | 23 | 2 | 7.5 | 1.7 | 24 | 2.4 | 95 | | >190 | Do. |
| 12 | 15 | 23 | 2 | 6 | 1.8 | 29 | 0.5 | 40 | 10 | 110 | |

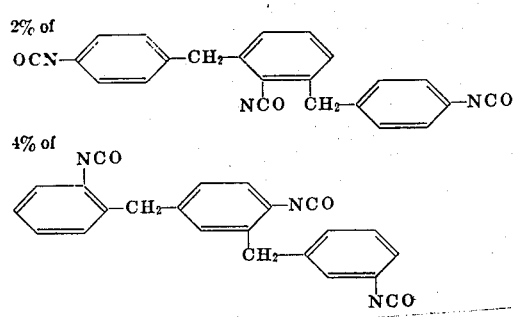

and 27 percent tetra and higher functional homologues of the foregoing isocyanates, the percentage of methylene groups which have one or two —NCO groups ortho thereto is about 66 percent of the total number of methylene groups in said higher functional isocyanate.

3. The polyisocyanurate foam of claim 1 wherein said inert blowing agent is a halohydrocarbon.

4. The polyisocyanurate foam of claim 1 wherein said catalyst is 2,4,6-tris-(dimethylaminomethyl) phenol.

* * * * *